Aug. 19, 1958  W. M. BROOKS  2,847,774
TAG
Filed Aug. 9, 1956  2 Sheets-Sheet 1
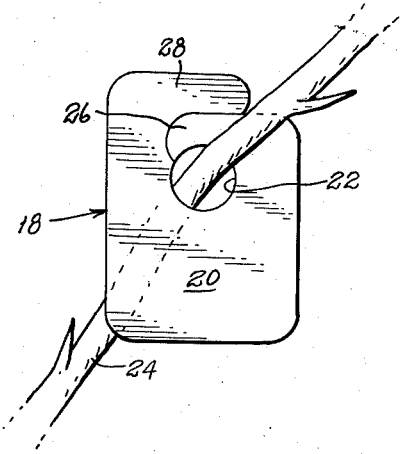
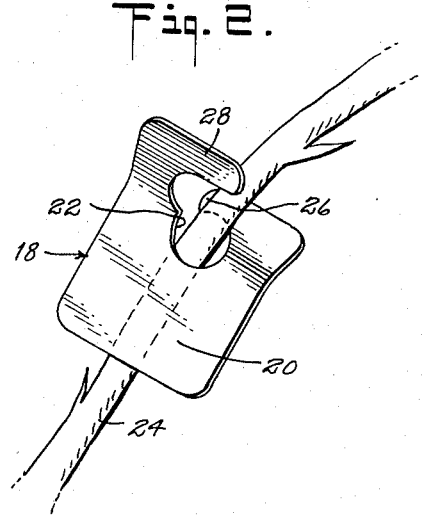
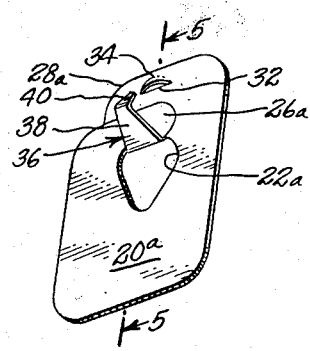
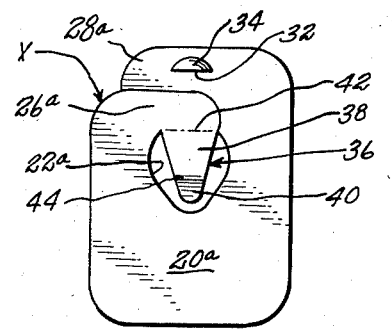
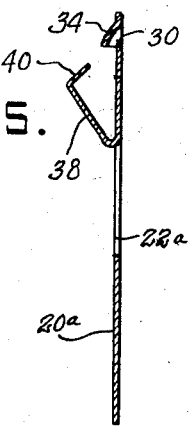
INVENTOR.
WINFRED M. BROOKS
BY
Robert Henderson
ATTORNEY Aug. 19, 1958 W. M. BROOKS 2,847,774
TAG
Filed Aug. 9, 1956 2 Sheets-Sheet 2
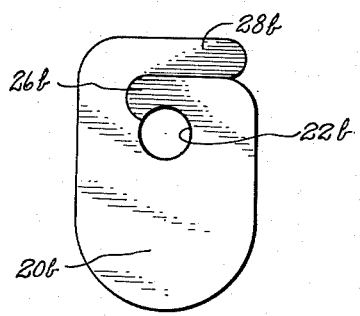
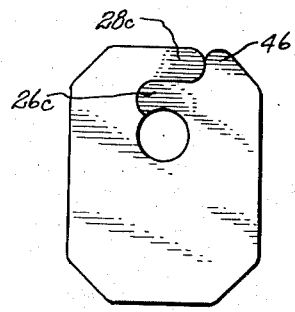
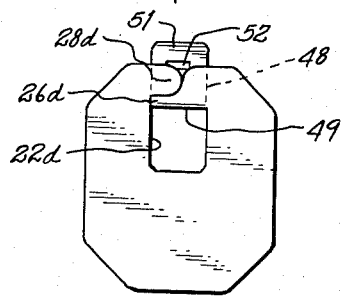
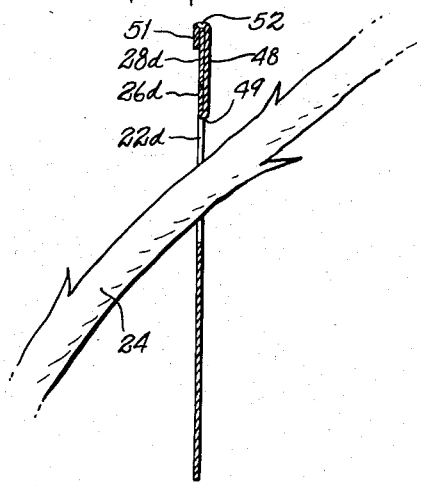
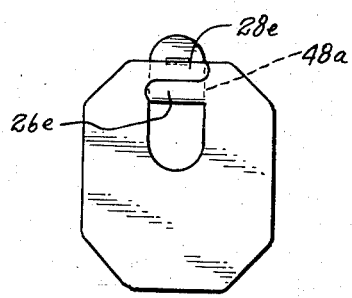
INVENTOR.
WINFRED M. BROOKS
BY
ATTORNEY

2,847,774

TAG

Winfred M. Brooks, West Orange, N. J., assignor to E. J. Brooks Company, Newark, N. J., a corporation of New Jersey Application August 9, 1956, Serial No. 603,106

6 Claims. (Cl. 40—2)

This invention relates to improvements in tags suitable for attachment to various articles of merchandise having some stem-like portion to which a tag, as herein disclosed, may be readily attached. For example, a tag according to the present invention is particularly useful for attachment to a stem or branch of a plant.

An important object of this invention is to provide such a tag which, while very readily attachable, strongly opposes accidental detachment.

Another important object is the provision of such a tag which includes means by which the tag may be clasped closed after attachment to positively forestall accidental detachment.

The foregoing and other more or less obvious objects are accomplished by the present invention, of which, for illustrative purposes, several embodiments are illustrated in the accompanying drawings without, however, limiting the invention to the particular, disclosed embodiments.

In the drawings:

Figure 1 is an elevational view of a tag, according to a first embodiment of this invention, as it appears when disposed upon a stem or branch of a plant.

Fig. 2 is a perspective view of the tag of Fig. 1 at an initial point in its application to the stem of the plant.

Fig. 3 is a perspective view of a tag, according to a second embodiment of this invention, in its condition immediately prior to its application to a stem-like part of an article of merchandise.

Fig. 4 is an elevational view of the tag of Fig. 3 with a locking prong of the tag in an approximately flat condition in which may be delivered by the tag manufacture to the user.

Fig. 5 is a central, sectional view of the tag of Fig. 3 substantially on the line 5—5 of the latter figure.

Fig. 6 is a cross-sectional view view of the tag of Fig. 3 on the same sectional line as Fig. 5, but showing the tag as fastened to a stem or branch of a plant.

Figs. 7, 8, 9 and 11 are elevational views of tags according to further embodiments of this invention; and Fig. 10 is a view somewhat similar in character to Fig. 6, but showing the tag of Fig. 9 as fastened upon a stem or branch of a plant.

A tag 18, according to the first embodiment illustrated in Figs. 1 and 2, may be die-cut from cardboard, sheet aluminum or other suitable sheet metal, or sheet celluloid or other suitable sheet-plastic material. The particular material selected should possess sufficient resiliency to enable the tag to function as hereinafter described.

As illustrated in Fig. 1, the tag 18 comprises a main or body portion 20, an upper part of which is cut out to provide an aperture 22 of suitable size for the accommodation therewithin of a stem or stem-like portion 24 of a piece of merchandise.

Extending leftwardly (as viewed in Fig. 1) from a portion of the body 20 which defines the right side of the aperture 22 is an inner togue 26 which extends across and defines the top of the aperture 22. The part of the body 20 which extends about and defines the left side of the aperture 22 has extending therefrom an outer tongue 28 which extends upwardly about the end of tongue 26 and rightwardly over the latter so that, as may be readily understood from Fig. 1, the tongues 26 and 28 are at the top of the aperture 22 and in substantial, radial alignment with the center of said aperture. As may also be seen from said figure, an outer edge of the inner tongue 26 is complemental to an inner edge of the outer tongue 28.

In considering the manner in which the tag 18 is applied to a stem or branch, the flexibility of the sheet material should be kept in mind. To apply the tag, the user preferably holds it by the body portion 20 and lightly presses the outer tongue 28 against the stem 24 at a point just leftwardly of the end of tongue 26. This has the effect of bending the tongue 28 forwardly to open up a space between the two tongues, whereupon the tag is shifted leftwardly to cause the stem to pass through said space and at least partly into the aperture 22, as shown in Fig. 2. Then, slight rotation of the tag counterclockwisely about the center of the aperture 22 causes the tongue 28 to clear the stem and flex or spring rearwardly into its initial, coplanar, intimate association with tongue 26, thus leaving the tag properly attached to the stem as it appears in Fig. 1.

It is important to note that the inner tongue 26 does not extend materially downwardly about the left side of the aperture 22 and that the tongue 28 at its free end does not extend downwardly about the tongue 26 or about any other part of the tag. The just-stated relationship of the two tongues is of some importance as rendering the tag removable with ease. Thus, if one wishes to remove the tag, it is necessary only to grasp the body 20 and move the upper part of the tag, comprising the tongues 26 and 28, forwardly, whereupon the two said tongues will flex rearwardly, permitting the tag to become detached from the stem or branch.

If, however, the inner tongue 26 were to extend downwardly about the left side of the aperture 22, the described flexing of the tongues would not facilitate removal of the tag because, in moving the tag forwardly to cause rearward flexing of the tongues to free the tag from the stem, the extended lower end of the inner tongue 26 would not flex rearwardly to any material extent but would remain substantially in the plane of the body of the tag, and, in that position, it would interfere with the free removal of the tag.

Although the described tag is easily removable intentionally in the manner hereinbefore described, it will readily be perceived that the tag will not become detached from the stem 24 accidentally because any pull or force applied to the tag, other than manipulation particularly suitable for removal purposes, would not separate the two tongues 26 and 28 in such fashion as to free the tag from the stem.

From the foregoing, it may be seen that the tag may be very inexpensively produced by being die-stamped out of cardboard or other suitable resilient sheet material; that it may readily be attached to a stem-like structure and may readily be removed intentionally from such a stem-like structure; and that the tag will not accidentally become detached from the stem.

In a tag such as is illustrated in Figs. 1 and 2, the body portion 20 affords a suitable surface upon which may be printed any desirable indicia as, for example, the name and/or address of the grower of a plant, or the name and particular type of the plant, the price, color or other desired information. All the other tags hereinafter described, also, similarly lend themselves to the application of suitable indicia thereon.

The second embodiment illustrated in Figs. 3-6, inclusive, differs from the first embodiment principally in that it has means by which an inner tongue 26a and an outer tongue 28a may be clasped together to afford some positive means of preventing their accidental separation. To make such a clamping arrangement effective, a tag according to the second embodiment, now under discussion, should preferably be formed of suitable, thin, sheet metal such as, for example, sheet aluminum. An aperture 30 is formed in tongue 28a by cutting a horizontal slit 32 in tongue 28a and by bulging, forwardly of the general plane of the body 20a, a small portion 34 of the sheet metal just above said slit, this slitting and bulging, of course, being accomplished by suitable cutting and bulging formations in the die by means of which the tag is produced. Also, in stamping-out this tag, a locking prong 36 is cut from the sheet-metal blank of which the tag is formed. This locking prong is left integral with the inner part of the inner tongue 26a and includes a base portion 38 bent forwardly and upwardly from the tongue 26a and, also, a catch portion 40 which is bent rearwardly and upwardly from base portion 38, as may best be understood from Fig. 5.

The tag of the second embodiment may be delivered by the tag manufacturer in the bent form in which it appears in Figs. 3 and 5, or, for compactness in packing for shipping, the base portion 38 and the catch portion 40 may be left approximately flat or, i. e., approximately in the plane of the body 20a, as may be understood by reference to Fig. 4, or may be bent only slightly out of such plane in preparation for further bending by the user of the tag. In either arrangement, the metal may be suitably scored, at 42, where the base portion 38 adjoins the tongue 26a, and also at 44, where the catch portion 40 adjoins the base portion 38, these scorings serving to facilitate bending at those points.

Assuming that the tag illustrated in Figs. 3 and 5 is in its condition as illustrated in those figures, it may be readily applied to a stem 24 by grasping the body portion 20a and pushing the tag into association with the stem in such manner that the stem engages the underside of the tag approximately at the point marked X in Fig. 4. This will cause the tongue 26a to flex forwardly, whereupon the tag may be moved leftwardly to permit the stem 24 to enter the aperture 22a, whereafter a slight rotation of the tag counterclockwisely about the center of the aperture 22a will cause the inner end of the tongue 26a to clear the stem and flex or snap rearwardly back into approximately the same plane as the tongue 28a.

The application of the tag of the second embodiment, as thus far described, is very similar to the application of the tag of the first embodiment. However, after the application of the tag of the second embodiment has proceeded to the extent just indicated, the base portion 38 is bent upwardly about an axis coincident with its juncture with tongue 26a and the catch portion 40 is somewhat flattened out in relation to said base portion, all as may be understood by comparison of Figs. 5 and 6. This bending of the base portion and flattening of the catch portion causes the latter to extend substantially into the aperture 30, thereby holding the two tongues 26a and 28a against accidental separation.

The tag thus applied can be removed by bending the tongue 28a rearwardly about a horizontal axis more or less coinciding with the center of the aperture 22a, which bending will cause the tongue 28a to pull away from the catch portion 40 and the latter to withdraw from the aperture 30. After such withdrawal of the catch portion 40, the tongues 26a and 28a are separated, enabling the tag to be removed easily from the stem.

The third embodiment illustrated in Fig. 7 differs from the first embodiment of Figs. 1 and 2 principally in that the lower edge of the body portion 20b is substantially semicircular rather than substantially rectangular in shape, and the outer tongue 28b is extended so that its free end terminates considerably closer to the most rightward edge of the tag. The latter characteristic is the only one of the mentioned differences which gives rise to any change in function. The change in function has to do with the manner in which the device may be applied to a stem-like member. A tag according to Fig. 7 may be applied to a stem by moving the tag rightwardly toward the stem in such manner that the extreme free end of the tongue 28b would engage the back or far side of the stem, allowing the latter to pass leftwardly between the separated tongues 28b and 26b and into the aperture 22b. This mode of application is different from that of the first embodiment in that, when the latter is applied, the base of the outer tongue, rather than its free end, is pressed against the front or near side rather than against the far side of the stem.

The fourth embodiment illustrated in Fig. 8 differs from the first embodiment of Figs. 1 and 2 chiefly in that the upper edge of the inner tongue 26c, instead of extending horizontally to the right edge of the tag, extends upwardly complementally to and substantially about the free end of the outer tongue 28c, thereby providing, in the upper right corner of the tag, an auxiliary tongue 46 which may be pressed against the front or near side of a stem to separate the tongues 26c and 28c in applying the tag to the stem.

The fifth embodiment of the invention, as illustrated in Figs. 9 and 10, is one which, as with the second embodiment of Figs. 3-6, should be formed preferably of suitable sheet metal such as, for example, aluminum. In this fifth embodiment, the aperture 22d is shaped more or less square, only as an indication that the stem-receiving aperture in a tag according to this invention need not necessarily be of circular shape. When a tag according to this embodiment is die-cut from a blank, the portion of the blank which coincides with the location of the aperture 22d is slit-cut to form, on inner tongue 26d, an auxiliary tongue 48 which is bent rearwardly and upwardly in back of tongues 26d and 28d, at line 49, which defines the inner edge of inner tongue 26d. The auxiliary tongue 48 is of a length considerably greater than the width of inner tongue 26d so that an end portion 51 of the auxiliary tongue 48, after its mentioned initial rearward and upward bending, will extend substantially above the upper edges of the tongues 26d and 28d. The portion 51 is adapted to be bent forwardly and downwardly over and in front of the tongues 26d and 28d, thereby locking the two latter securely together. In order to facilitate the last-mentioned bend, a slit or aperture 52 is preferably provided at the bend line so that the last-mentioned bend may be more easily accomplished.

The sixth embodiment illustrated in Fig. 11 is very similar to the fifth embodiment, the principal difference being that the tongue 26e extends to the left edge of auxiliary tongue 48a and the tongue 28e extends to the right edge of auxiliary tongue 48a, so that, when the latter is folded forwardly and downwardly in front of tongue 28e, it will overlap the latter throughout a very substantial portion of the latter's length.

Although it has hereinbefore been indicated that tags according to this invention may be formed of cardboard, celluloid or other sheet-plastic material or sheet metal, it will be realized that the nature of the tag embodying the invention will control, to a large extent, the nature of the material to be selected. Thus, tags according to the first, third and fourth embodiments may be of cardboard or of sheet plastic or sheet metal, whereas tags according to the second, fifth and sixth embodiments should preferably be formed of sheet metal although, perhaps, in some circumstances, cardboard or sheet-plastic material could conceivably be employed. If the tags are formed of metal, good manufacturing procedure would suggest that the circular or other shaped edge defining the stem-receiving aperture of the tag should be rolled so as to avoid possible damage to the merchandise to which the tag is applied. Likewise, in metal tags, it might be considered advantageous to roll the outer edge of the tag as a protection for those who have occasion to handle the tag.

It should be obvious that the present inventive concept may be used in various structures other than those shown and described herein without, however, departing from the invention as set forth in the following claims.

I claim:

1. A tag of resilient sheet material comprising a lower blank portion and an upper locking portion having an aperture for receiving a stem-like merchandise portion therein, said aperture being coincident with a line extending centrally through both said upper locking portion and said lower blank portion, said locking portion comprising an inner tongue extending perpendicularly of said line from a point in vertical alignment with one side of said aperture and having a free end above said aperture and approximately in vertical alignment with the opposite side of said aperture, and an outer tongue intimately along side of and in the same plane as said inner tongue, the outer tongue extending perpendicularly of said line from a point in vertical alignment with said opposite side of said aperture and having a free end above said inner tongue and toward one side of said aperture, the tag further including an auxiliary tongue extending upwardly from said inner tongue about the free end of the outer tongue, said auxiliary tongue being engageable with a stem-like merchandise portion to bend said auxiliary tongue and said inner tongue out of the plane of the outer tongue to open up a space through which said stem-like portion may pass into said aperture.

2. A tag of resilient sheet material comprising a lower blank portion and an upper locking portion having an aperture for receiving a stem-like merchandise portion therein, said aperture being coincident with a line extending centrally through both said upper locking portion and said lower blank portion, said locking portion comprising an inner tongue extending perpendicularly of said line from a point in vertical alignment with one side of said aperture and having a free end above said aperture and approximately in vertical alignment with the opposite side of said aperture, and an outer tongue intimately along side of and in the same plane as said inner tongue, the outer tongue extending perpendicularly of said line from a point in vertical alignment with said opposite side of said aperture and having a free end above said inner tongue and toward said one side of said aperture, the tag further including clasp means on one of said tongues, engageable with the other of said tongues after application of the tag to an article of merchandise, to oppose bending of said tongues out of coplanar relationship, thereby opposing separation of the tag from the merchandise.

3. A tag according to claim 2, said clasp means comprising a locking clasp, integral with one of said tongues, said clasp being bendable at its juncture with said one tongue into lapping relationship with one side face of the other of said tongues and having a free end portion bendable about an edge of said other tongue into lapping relationship with the other side face of said other tongue.

4. A tag according to claim 3, said outer tongue being in lapping relationship to said locking clasp to the extent of approximately one half the width of the latter.

5. A tag according to claim 3, both said tongues being in alignment with each other throughout substantially the entire width of said locking clasp.

6. A tag according to claim 2, said outer tongue having a locking aperture formed therein, and said clasp means comprising a locking clasp which is integral with the inner edge of said inner tongue and bendable upwardly from said inner edge into overlapping relationship to said inner tongue and having a catch portion, at its free end, engageable within said locking aperture when thus upwardly bent.

References Cited in the file of this patent

UNITED STATES PATENTS

| | | |
|---|---|---|
| 1,057,362 | Smith | Mar. 25, 1913 |
| 1,272,968 | Kleebauer | July 16, 1918 |
| 2,031,229 | Roth | Feb. 18, 1936 |
| 2,625,758 | Shephard | Jan. 20, 1953 |
| 2,723,816 | Drysdale | Nov. 15, 1955 |
| 2,768,458 | Anania | Oct. 30, 1956 |

UNITED STATES PATENT OFFICE
CERTIFICATE OF CORRECTION

Patent No. 2,847,774                                                    August 19, 1958

Winfred M. Brooks

It is hereby certified that error appears in the printed specification of the above numbered patent requiring correction and that the said Letters Patent should read as corrected below.

Column 5, line 27, for "toward one" read -- toward said one --.

Signed and sealed this 21st day of October 1958.

(SEAL)
Attest:

KARL H. AXLINE
Attesting Officer

ROBERT C. WATSON
Commissioner of Patents